United States Patent
Bartley et al.

(10) Patent No.: US 7,613,870 B2
(45) Date of Patent: Nov. 3, 2009

(54) EFFICIENT MEMORY USAGE IN SYSTEMS INCLUDING VOLATILE AND HIGH-DENSITY MEMORIES

(75) Inventors: Gerald K. Bartley, Rochester, MN (US); John M. Borkenhagen, Rochester, MN (US); William H. Cochran, Rochester, MN (US); William P. Hovis, Rochester, MN (US); Paul W. Rudrud, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 10/992,443

(22) Filed: Nov. 18, 2004

(65) Prior Publication Data

US 2006/0106984 A1 May 18, 2006

(51) Int. Cl.
*G06F 12/00* (2006.01)
(52) U.S. Cl. .................. 711/103; 711/118; 711/154
(58) Field of Classification Search .......... None
See application file for complete search history.

(56) References Cited

U.S. PATENT DOCUMENTS

| | | | | |
|---|---|---|---|---|
| 5,325,504 A | * | 6/1994 | Tipley et al. | 711/128 |
| 5,386,546 A | * | 1/1995 | Hamaguchi | 711/133 |
| 5,586,293 A | * | 12/1996 | Baron et al. | 711/118 |
| 6,035,378 A | * | 3/2000 | James | 711/147 |
| 6,073,225 A | * | 6/2000 | James et al. | 711/202 |
| 6,216,180 B1 | * | 4/2001 | Kendall et al. | 710/35 |
| 6,578,111 B1 | * | 6/2003 | Damron et al. | 711/133 |
| 2003/0078907 A1 | * | 4/2003 | Soemo et al. | 707/1 |
| 2004/1006862 | * | 4/2004 | Sechrest et al. | 711/158 |

OTHER PUBLICATIONS

Microsoft Computer Dictionary, 5th ed. © 2002, Microsoft Press, p. 81.*

* cited by examiner

*Primary Examiner*—Kevin Verbrugge
(74) *Attorney, Agent, or Firm*—Dugan & Dugan (57) ABSTRACT

A first method for efficient memory usage includes (1) determining whether data retrieved from a first storage device is characterized as data that is primarily read; and (2) if data retrieved from the first storage device is characterized as data that is primarily read (a) writing the retrieved data in a temporary storage device with short write latency; and (b) writing the retrieved data in a high-density memory. Numerous other aspects are provided.

22 Claims, 5 Drawing Sheets

EFFICIENT MEMORY USAGE IN SYSTEMS INCLUDING VOLATILE AND HIGH-DENSITY MEMORIES

FIELD OF THE INVENTION

The present invention relates generally to processors, and more particularly to methods and apparatus for efficient memory usage.

BACKGROUND

A computer system may include volatile memory, such as DRAM. The computer system performance may be directly proportional to the amount of memory included in the computer system. However, the amount of memory (e.g., DRAM) that may be included in the computer system may be limited due to heat generation, cost, physical packaging constraints, etc., associated with such memory. Accordingly, methods and apparatus for efficient memory usage are desired.

SUMMARY OF THE INVENTION

In a first aspect of the invention, a first method is provided for efficient memory usage. The first method includes the steps of (1) determining whether data retrieved from a first storage device is characterized as data that is primarily read; and (2) if data retrieved from the first storage device is characterized as data that is primarily read (a) writing the retrieved data in a temporary storage device with short write latency; and (b) writing the retrieved data in a high-density memory.

In a second aspect of the invention, a second method is provided for efficient memory usage. The second method includes the steps of (1) determining whether data retrieved from a first storage device will only be read; and (2) if data retrieved from the first storage device is read-only data (a) storing the retrieved data in a temporary storage device with low write latency; and (b) writing the retrieved data in a high-density memory.

In a third aspect of the invention, a method is provided. The method includes the steps of (1) storing data that is characterized as primarily read in high-density memory and temporary memory; (2) retrieving the data from temporary memory until the data has been stored in high-density memory; and (3) releasing the temporary memory once the data has been stored in the high-density memory.

In a fourth aspect of the invention, a first apparatus is provided for efficient memory usage. The first apparatus includes (1) a high-density memory; (2) a volatile memory; (3) a first storage device; (4) a temporary storage device with short write latency; and (5) a monitoring device, coupled to the high-density memory, volatile memory, first storage device, temporary storage device, and adapted to identify data which is characterized as primarily read. The apparatus is adapted to (a) determine whether data retrieved from the first storage device is characterized as data that is primarily read; and (b) if data retrieved from the first storage device is characterized as data that is primarily read (i) write the retrieved data in the temporary storage device; and (ii) write the retrieved data in the high-density memory.

In a fifth aspect of the invention, a second apparatus is provided for efficient memory usage. The second apparatus includes (1) a high-density memory; (2) a volatile memory; (3) a first storage device; (4) a temporary storage device with low write latency; and (5) a monitoring device, coupled to the high-density memory, volatile memory, storage device and temporary storage device. The apparatus is adapted to (a) identify data retrieved from the first storage device as read-only data; and (b) if data retrieved from the first storage device is characterized as read-only data (i) store the retrieved data in the temporary storage device; and (ii) write the retrieved data in the high-density memory.

In a sixth aspect of the invention, an apparatus is provided. The apparatus includes (1) a high-density memory; (2) a temporary memory with a low write latency; and (3) a monitoring device, coupled to the high-density memory and temporary memory, and adapted to identify data as primarily read. The apparatus is adapted to (a) store data that is characterized as primarily read in high-density memory and temporary memory; (b) retrieve the data from temporary memory until the data has been stored in high-density memory; and (c) release the temporary memory once the data has been stored in the high-density memory.

In a seventh aspect of the invention, a third method for efficient memory usage is provided. The third method includes the steps of (1) determining whether data retrieved from a first storage device is characterized as data that is primarily read; and (2) if data retrieved from the first storage device is characterized as data that is primarily read, writing the retrieved data in a high-density memory.

In an eight aspect of the invention, a third apparatus for efficient memory usage is provided. The third apparatus includes (1) a high-density memory; (2) a volatile memory; (3) a first storage device; and (4) a monitoring device, coupled to the high-density memory, volatile memory and first storage device. The third apparatus is adapted to (a) determine whether data retrieved from the first storage device is characterized as data that is primarily read; and (b) if data retrieved from the first storage device is characterized as data that is primarily read, write the retrieved data in the high-density memory. Numerous other aspects are provided in accordance with these and other aspects of the invention.

Other features and aspects of the present invention will become more fully apparent from the following detailed description, the appended claims and the accompanying drawings.

DETAILED DESCRIPTION

The present invention provides methods and apparatus for improving the efficiency of memory usage. More specifically, according to the present invention, a computer system may include at least one volatile memory (e.g., DRAM) and at least one high-density memory, (e.g., non-volatile memory, flash memory, etc.) as its main memory for storing data. The present invention takes advantage of the fact that high-density memory typically may store more memory in a smaller area, performs fast reads but slow writes, is less expensive and consumes less power for data read operations than the volatile memory. The present invention may monitor memory (e.g., DRAM, hard disk, or the like) usage, via software or hardware, to determine whether data stored in such memory may be characterized as data that is infrequently (or never) written (e.g., characterized as "primarily-read" data). By writing (e.g., storing) such data in high-density memory (e.g., flash memory), the present invention may reduce an overall memory power consumption and memory cost while increasing memory density, and therefore, memory capacity.

When the present invention determines data requested from memory (e.g., DRAM, hard disk, or the like) may be characterized as data that is infrequently (or never) written, the present invention may write the data in a temporary storage device, such as a workspace in the DRAM or a cache memory, from which the data may be written (relatively slowly) to the high-density memory (e.g., flash memory). In this manner, such data remains available to be accessed from the temporary storage device while the data is being written to the high-density memory. Further, the present invention provides methods and apparatus for writing to data stored in the high-density memory.

By employing high-density memory for storing data which is characterized as data that is infrequently (or never) written (e.g., data characterized as "primarily-read") and volatile memory for storing other types of data, the present invention may reap the high-density memory benefits of lower cost, lower power consumption for data read operations and increased density, and avoid a high-density memory drawback of long write latency, thereby efficiently using memory.

Figure 1:
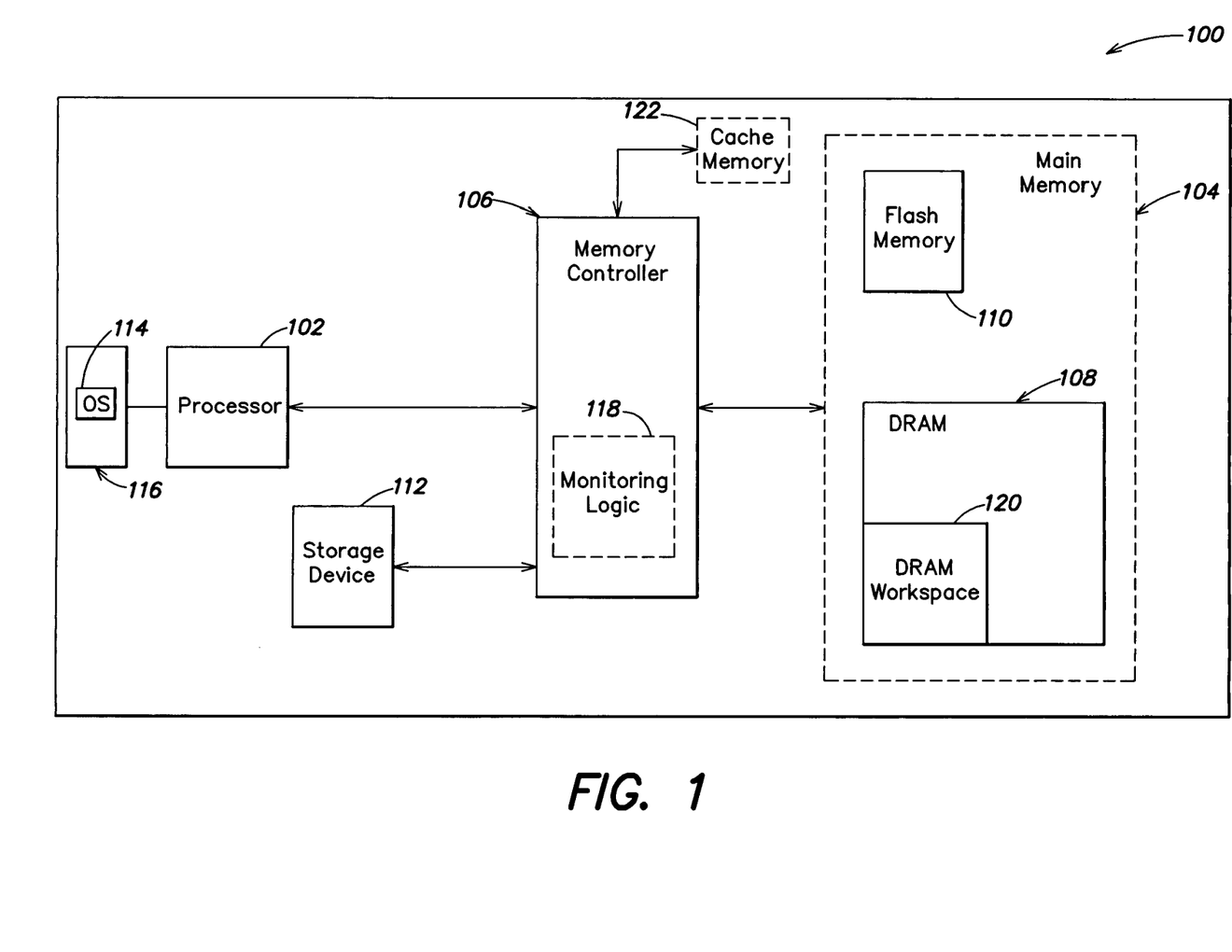
FIG. 1 is a block diagram of an apparatus for efficient memory usage in accordance with an embodiment of the present invention.

FIG. 1 is a block diagram of an apparatus for efficient memory usage in accordance with an embodiment of the present invention. The apparatus may be a computer system or similar device. With reference to FIG. 1, the apparatus 100 may include a processor 102 for executing instructions. The processor 102 is coupled to main memory 104 (e.g., via a memory controller 106 which may include control logic). The main memory 104 includes one or more volatile memories 108, such as DRAMs or the like, and one or more high-density memories 110, such as flash memories or the like. Read and write operations to the volatile memory 108 and a read operation to the high-density memory 110 may be completed quickly. However, a write operation to the high-density memory 110 relatively may take substantially more time than the above-mentioned operations. For example, read and write operations to the volatile memory 108 may be completed in nanoseconds. Similar to a read operation on the volatile memory 108, a read operation on the high-density (e.g., flash) memory 110 may be completed in nanoseconds. However, in contrast to the volatile memory 108, a write operation to the high-density memory 110 may require milliseconds to complete, and therefore, may result in long write latency.

The memory controller 106 is also coupled to a first storage device 112, such a disk drive, memory or the like. In response to a request from the processor 102, the memory controller 106 may retrieve data stored in the first storage device 112 and write (e.g., store) such data in the main memory 104. For example, a page (e.g., 4 kB or more) of data may be retrieved from the storage device 112 and stored in the main memory 104.

The apparatus 100 may include a monitoring device for identifying memory locations that are characterized as infrequently or never written to. In some embodiments, the processor 102 may serve as the monitoring device by executing software 114. Such software 114 may be included in an operating system (OS) executed by the processor 102. In some embodiments, the OS may be stored in a read-only memory (ROM) 116. However, the software 114 may be separate from the OS.

Alternatively, the apparatus 100 may include monitoring logic 118 (shown in phantom) that serves as the monitoring device. The memory controller 106 and/or monitoring logic 118 may include any suitable combination of logic, registers, memory or the like. In some embodiments, the memory controller 106 includes the monitoring logic 118 (although the monitoring logic 118 may be located elsewhere.)

The apparatus 100 may include a second (e.g., temporary) storage device that may store data retrieved from the first storage device 112 before such data is stored in the high-density memory 110. The second storage device may perform a read and/or write operation with short latency. In this manner, data retrieved from the first storage device 112 may be stored quickly (e.g., in nanoseconds) in the temporary storage device and data to be written to the high-density memory 110 may be read quickly (e.g., in nanoseconds) from the temporary storage device. In some embodiments, a portion 120 of the volatile memory 108 (e.g., DRAM) is allocated as a working space that serves as the temporary storage device. Alternatively, the apparatus 100 may include a cache memory 122 (shown in phantom) that serves as the temporary storage device. In such embodiments, the cache memory 122 may be coupled to and/or included in the memory controller 106.

As described above, the apparatus 100 includes high-density (e.g., flash) memory 110, which is denser, less expensive and consumes less power than volatile memory (e.g., DRAM) 108 for performing a read operation. Therefore, the present invention may allow more memory to be coupled to the processor 102 than a conventional computer system with a main memory which only consists of DRAM.

Figure 2:
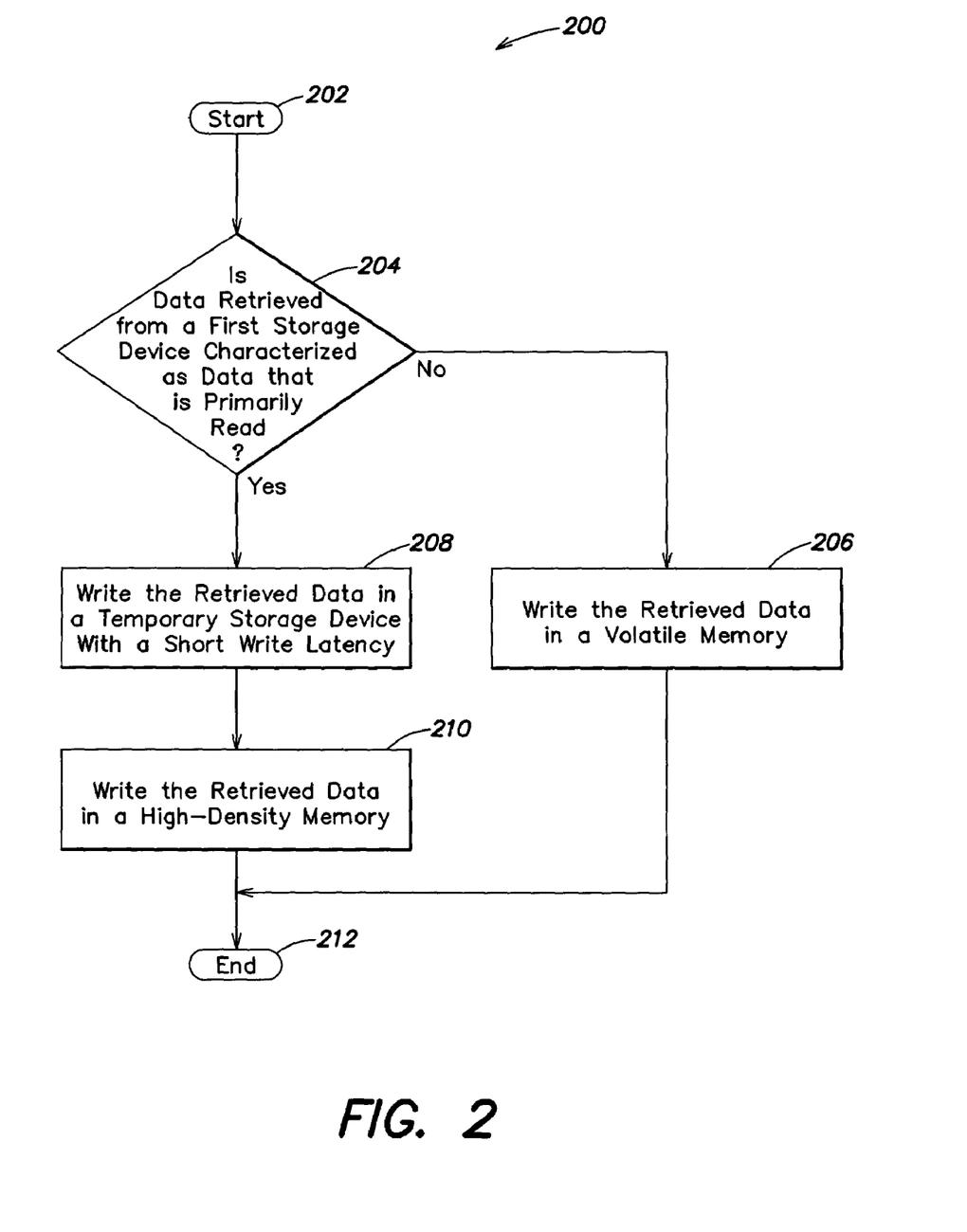
FIG. 2 illustrates a method for efficient memory usage in accordance with an embodiment of the present invention.

The operation of the apparatus for efficient memory usage is now described with reference to FIG. 1 and with reference to FIG. 2 which illustrates a method for efficient memory usage in accordance with an embodiment of the present invention. With reference to FIG. 2, in step 202, the method 200 begins. In step 204, it is determined whether data retrieved from a first storage device 112 is characterized as data that is primarily read. For example, the monitoring device (e.g., processor 102 or monitoring logic 118) of the apparatus 100 identifies the retrieved data as primarily-read based on (e.g., by monitoring for) (1) a page attribute associated with a command to retrieve such data; (2) a memory address associated with the command (e.g., whether the memory address is included in a range of memory addresses identified as primarily-read); and/or (3) memory access patterns (e.g., to the volatile memory) for the memory address associated with the command. Examples of primarily-read data include but are not limited to a code segment, web page, database including relatively static data, such as a telephone book, order history, customer list, or the like. As described below, such data may be stored in the high-density (e.g., flash) memory 110 such that the apparatus benefits from the advantages of the high-density memory 110 without suffering from the disadvantages of the high-density memory 110.

In embodiments in which software 114 is employed for identifying data retrieved from the first storage device 112 as characterized as data that is (e.g., or will be) primarily read, similar to the monitoring logic 118, the software 114 may make such identification based on (e.g., by monitoring for) (1) a page attribute associated with a command to retrieve such data; (2) a memory address associated with the command (e.g., whether the memory address is included in a range of memory addresses identified as primarily-read); and/or (3) memory access patterns (e.g., to the volatile memory) for the memory address associated with the command. The software 114 may create a table of memory address ranges that characterizes memory addresses within such ranges (e.g., as read-only, cacheable, etc.). The software 114 may provide such table to the memory controller 106.

If it is determined, in step 204, that data retrieved from the first storage device 112 is not characterized as data that is primarily read, step 206 is performed. In step 206, the retrieved data is written (e.g., stored) in a volatile memory 108 and the method ends at step 212. If the monitoring device determines the retrieved data is not characterized as data that is primarily read, such data may be written to more than infrequently. A write operation to the high-density (e.g., flash) memory 110 relatively requires substantially more time (e.g., milliseconds) than a read or write operation to volatile memory 108 or a read operation to the high-density memory 110 (e.g., nanoseconds), and therefore, has a long latency. Consequently, by storing such data in the volatile memory 108, the present methods and apparatus avoid one or more disadvantages of the high-density (e.g., flash) memory 110.

Alternatively, if it is determined, in step 204, that data retrieved from the first storage device 112 is characterized as data that is primarily read, step 208 is performed. In step 208, the retrieved data is written (e.g., stored) in a temporary storage device with a short write latency. For example, in embodiments in which the volatile memory 108 includes a portion 120 allocated as a working space that serves as the temporary storage device, the retrieved data is stored in the portion 120. Similarly, in embodiments in which the apparatus 100 includes a cache memory 122 that serves as the temporary storage device, the retrieved data is stored in the cache memory 122. As stated, the temporary storage device may perform a write operation with short latency. Therefore, the data retrieved from the first storage device 112 may be written relatively quickly (compared to a time required to write to the high-density memory 110) (e.g., in nanoseconds) to the temporary storage device. Further, the temporary storage device may perform a read operation with short latency. Consequently, once the data retrieved from the first storage device 112 is stored in the temporary storage device, such data may be read relatively quickly (e.g., in nanoseconds) from the temporary storage device (compared to a time required to write to the high-density memory 110).

In step 210, the retrieved data is written in a high-density memory. As stated, a write operation to the high-density memory 110 has long latency, and therefore, may not be written relatively quickly (e.g., may be written in milliseconds) (compared to a read or write operation to volatile memory 108). While the write operation is performed on the high-density memory 110, the high-density memory 110 is unavailable (e.g., data may not be read from the high-density memory 110). However, because the retrieved data was stored in the temporary storage device in step 208, the retrieved data remains available to be read from the temporary storage device while the retrieved data is written to the high-density memory 110. In this manner, the apparatus 100 may avoid any performance degradation due to the long latency of a write operation to the high-density memory 110. Once the retrieved data is written in the high-density memory 110, a read operation (e.g., with a relatively short latency) may be performed on the high-density memory 110 in response to read requests for such data. Thereafter, step 212 is performed, in which the method 200 ends.

Additionally, once the retrieved data is stored in the high-density memory 110, memory locations of the temporary storage device in which the retrieved data is stored may be made available for storing other data (e.g., the temporary memory is freed).

Through use of the method 200 of FIG. 2, the apparatus for efficient memory usage may reap the high-density memory benefits of lower cost, lower power consumption for read operations and increased density, and avoid the high-density memory drawbacks of long write latency and higher power consumption for a write operation than volatile memory.

Figure 3:
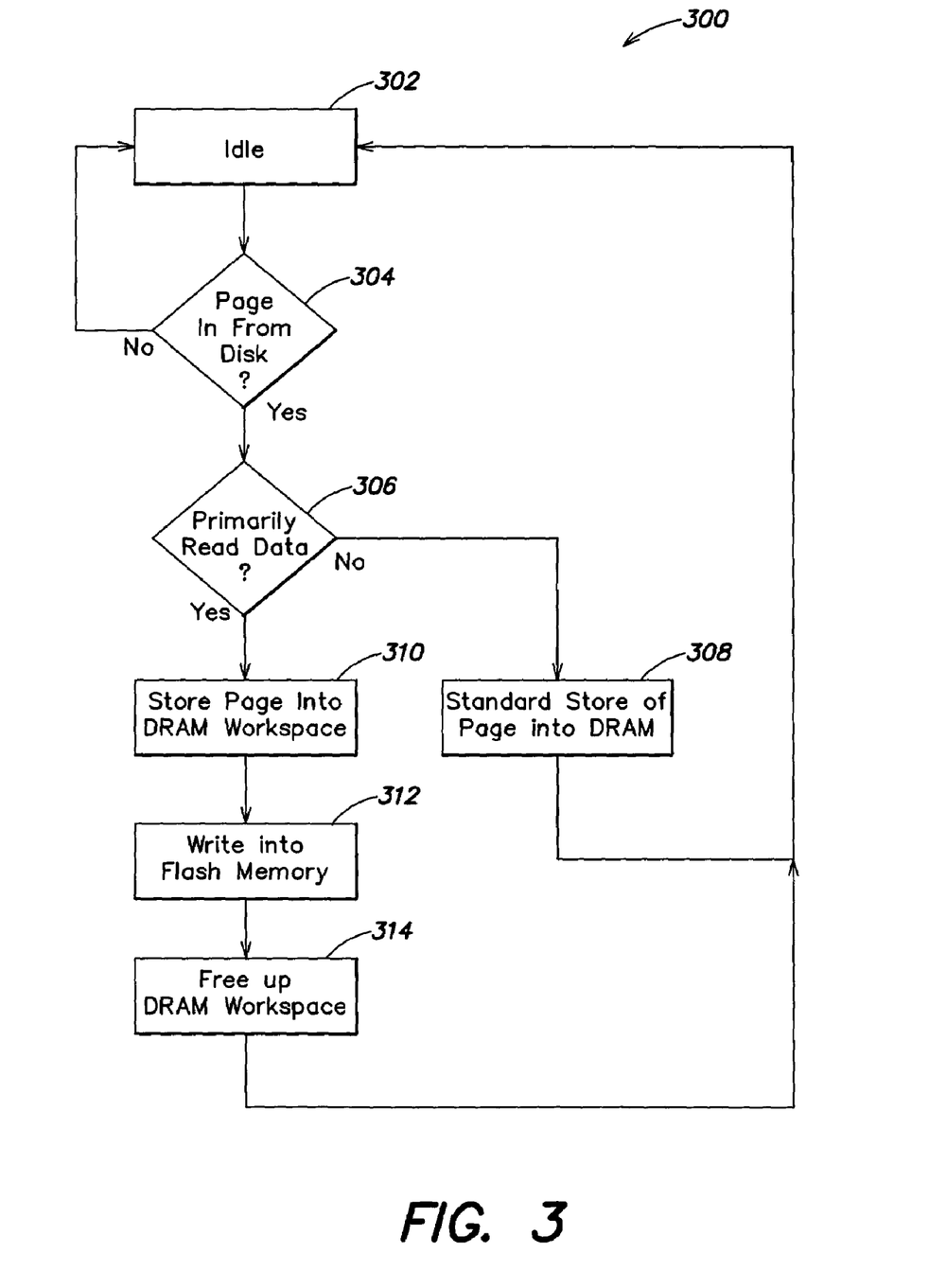
FIG. 3 is a process flow diagram for efficient memory usage in accordance with an embodiment of the present invention.

FIG. 3 is a process flow diagram for efficient memory usage in accordance with an embodiment of the present invention. With reference to FIG. 3, the process flow diagram 300 illustrates exemplary operation of an apparatus for separating data to be stored in regular volatile memory from data that is primarily read and a good candidate for storage in high-density memory, such as the apparatus 100. For example, in step 302 the apparatus 100 (e.g., processor 102 of the apparatus 100) is idle. In step 304, the apparatus 101 determines whether data was retrieved from the first storage device 112. For example, the apparatus 100 may determine whether the processor 102 received a request to retrieve data from the first storage device 112. If the apparatus 100 determines no such request was received, the processor 102 becomes idle. Alternatively, if the apparatus 100 determines a request to retrieve data from the first storage device 112 was received, in response to the request, the apparatus 100 may retrieve the data (e.g., retrieve memory locations which store the data) from the first storage device 112.

In step 306, the apparatus 100 determines whether the data is characterized as data that is primarily read. If the apparatus 100 determines the data is not characterized as data that is primarily read, in step 308, the apparatus 100 writes (e.g., stores) the data in the volatile memory 108 (e.g., DRAM). Thereafter, the processor 102 becomes idle.

Alternatively, if the apparatus 100 determines, in step 306, that the data is characterized as data that is primarily read, in step 310, the apparatus 100 stores the retrieved data in the temporary storage device (e.g., DRAM workspace 120). In step 312, the apparatus 100 writes the retrieved data to the high-density memory 110. Once the data is written to the high-density memory 110, in step 314, memory addresses of the temporary storage device in which the data is stored are made available for storing other data (e.g., freed). Thereafter, the processor 102 is idle.

Figure 4:
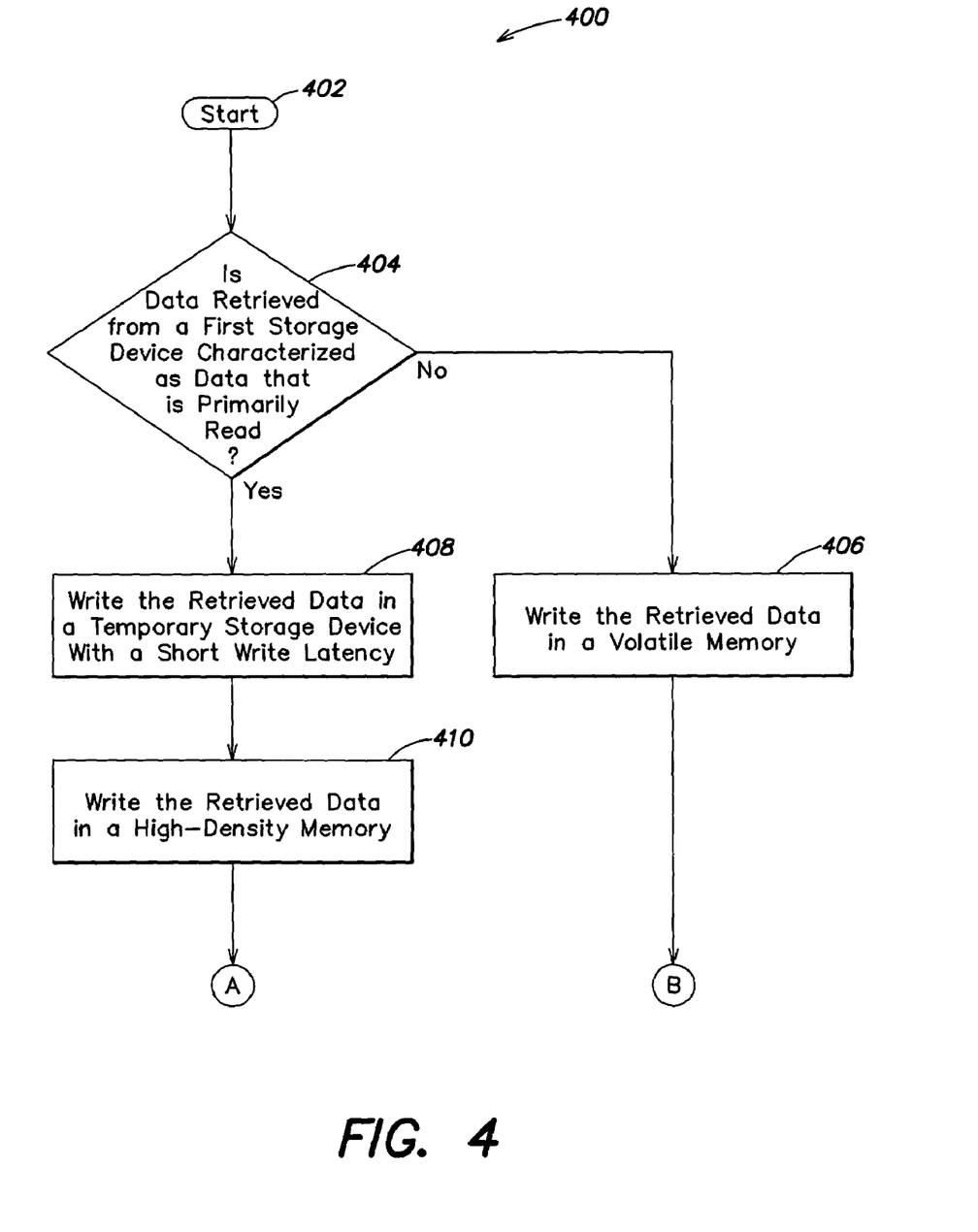
FIGS. 4-5 illustrate a method for writing to high-density memory in accordance with an embodiment of the present invention.
Figure 5:
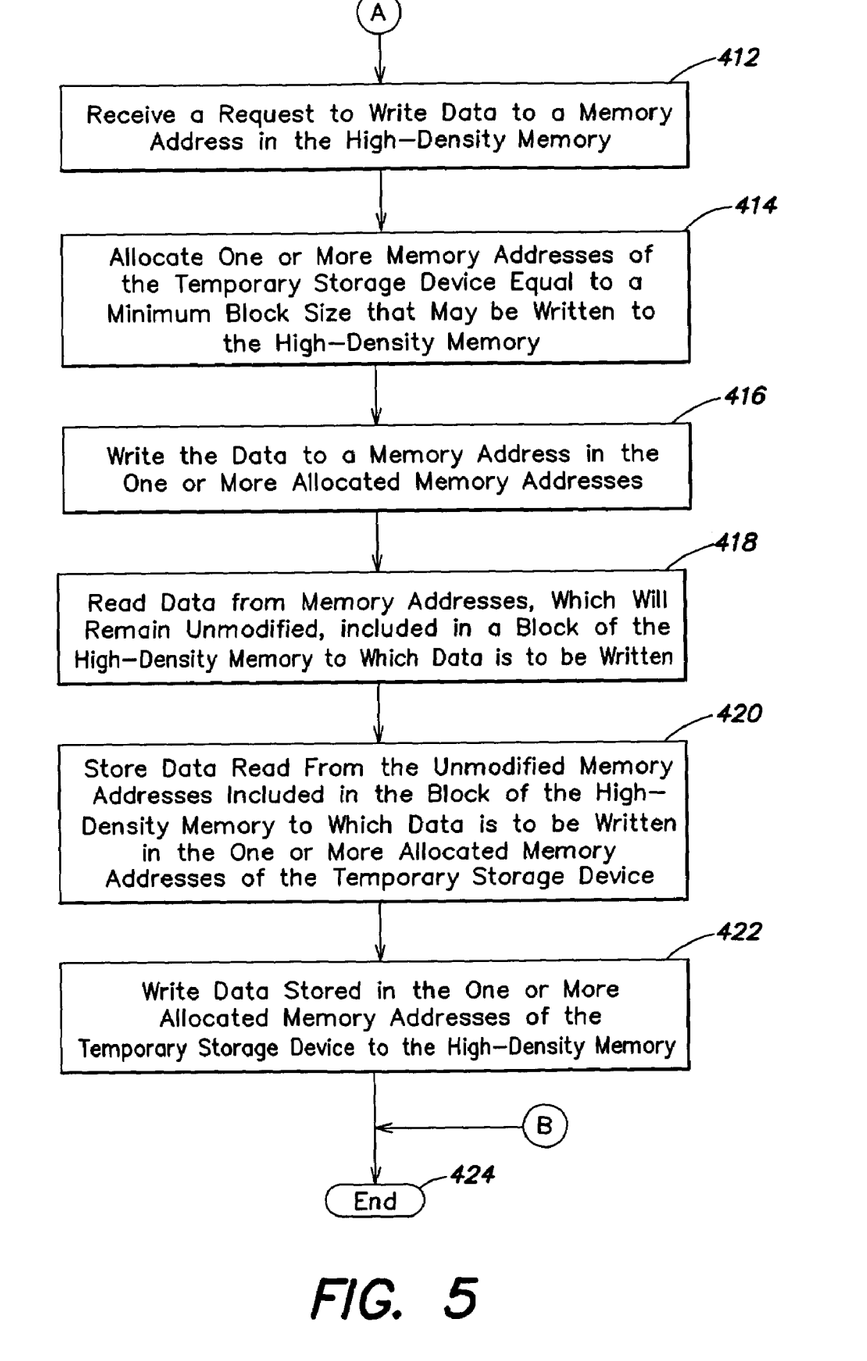

FIGS. 4-5 illustrate a method for writing to high-density memory in accordance with an embodiment of the present invention. With reference to FIGS. 4-5, the method 400 for writing to high-density memory of FIGS. 4-5 is similar to the method 200 for efficient memory usage. More specifically, steps 402-410 and 424 of method 400 are the same as steps 202-212, respectively, and therefore, are not described in detail herein. In step 412, the apparatus 100 may receive a request to write data to a memory address in the high-density memory 110. For example, the apparatus 100 may receive a request to write data to a memory address included in a block of high-density memory addresses.

In step 414, one or more memory addresses of the temporary storage device equal to a minimum block size that may be written to the high-density memory are allocated. For example, the memory controller 106 (e.g., logic included in the memory controller 106) may allocate a region of the temporary storage device that is equivalent in size to a minimum block (e.g., of memory addresses) of high-density memory 110 to which data may be written for storing data.

In step 416, the data is written to a memory address in the one or more allocated memory addresses. For example, the memory controller 106 may write data to one or more memory addresses in the allocated region of the temporary storage device to reflect the changes to be made to data stored in the high-density memory 110. As stated, a write operation may be performed on the temporary storage device with short latency. In this manner, as stated, data may be written relatively quickly (e.g., in nanoseconds) to the temporary storage device.

In step 418, data is read from memory addresses, which will remain unmodified, included in the block of high-density memory to which data is to be written. As stated, a read operation may be performed on high-density memory 110 with short latency. Therefore, the data from unmodified memory addresses (e.g., addresses that will be unmodified by the write request) included in the block of high-density memory that includes the memory address to which data is to be written may be read relatively quickly (e.g., in nanoseconds).

In step 420, the data read from the unmodified memory addresses included in the block of the high-density memory to which data is to be written is stored in the one or more allocated memory addresses of the temporary storage device. As stated, a write operation may be performed on the temporary storage device with short latency. Therefore, data may be stored (e.g., written) relatively quickly (e.g., in nanoseconds) to the temporary storage device. In this manner, the allocated region of the temporary storage device reflects the block on the high-density memory 110 to which data is to be written after such data has been written to the high-density memory 110.

In step 422, data stored in the one or more allocated memory addresses of the temporary storage device is written to the high-density memory 110. For example, the memory controller 106 may write data from the allocated region of the temporary storage device to the high-density memory 110. As stated, write operations to the high-density memory 110 may require milliseconds to complete, and therefore, result in long write latency. Further, the high-density memory 110 is unavailable until the write operation completes. However, because the allocated region of the temporary storage device reflects the block on the high-density memory 110 to which data is to be written after such data has been written to the high-density memory 110, data stored in the high-density memory 110 may be retrieved from the temporary storage during the write operation to the high-density memory 110. Consequently, the long write latency may be reduced and/or avoided. Thereafter, step 424 is performed, in which the method 400 ends.

Additionally, once data stored in the one or more allocated memory addresses of the temporary storage device is written to the high-density memory 110, the one or more allocated memory addresses of the temporary storage device are made available for storing other data (e.g., freed).

Through use of the method 400 of FIGS. 4-5, the apparatus 100 may perform a data write operation on the high-density memory 110 while avoiding the high-density memory drawback of long write latency. Although one or more of steps 412-422 are performed by the memory controller 106 (e.g., logic included in the memory controller 106, such as control logic), another component may perform one or more of the steps.

The foregoing description discloses only exemplary embodiments of the invention. Modifications of the above disclosed apparatus and methods which fall within the scope of the invention will be readily apparent to those of ordinary skill in the art. For instance, in some embodiments the apparatus 100 may adjust memory mapping in the memory controller 106. Although the method 400 allocates one or more temporary storage device memory addresses equal to a minimum block size that may be written to the high-density memory, and transfers data corresponding to such block size between the temporary storage device and high-density memory 110, in other embodiments, the method 400 may allocate a region of memory addresses to the temporary storage device corresponding to the entire high-density memory address range, and transfer data corresponding to such region between the temporary storage device and high-density memory 110. In this manner, data stored in the entire high-density memory 110 may be retrieved from the temporary storage during the write operation to the high-density memory 110 and therefore, is accessible. Consequently, the long write latency of the high-density memory is hidden.

According to a broader aspect of the invention, methods and apparatus are provided for (1) determining whether data retrieved from a first storage device is characterized as data that is primarily read; and (2) if data retrieved from the first storage device is characterized as data that is primarily read, writing the retrieved data in a high-density memory. In such embodiments, data retrieved from the first storage device 112 directly may be written to the high-density memory 110 (e.g., the retrieved data may not be written to a temporary storage location, and therefore, such embodiments may not include a temporary storage location).

Accordingly, while the present invention has been disclosed in connection with exemplary embodiments thereof, it should be understood that other embodiments may fall within the spirit and scope of the invention, as defined by the following claims.

The invention claimed is:

1. A method for efficient memory usage, comprising:
determining whether data retrieved from a first storage device is characterized as data that is primarily read, wherein determining whether data retrieved from the first storage device is characterized as data that is primarily read includes:
monitoring for at least one of a processor access pattern to a memory, an attribute associated with a command and a memory address of the command; and
identifying data retrieved from the first storage device as characterized as data that is primarily read based on the monitoring;
if data retrieved from the first storage device is characterized as data that is primarily read:
writing the retrieved data in a temporary storage device with short write latency; and
writing the retrieved data in a high-density memory;
receiving a request to write data to a memory address in the high-density memory;
allocating one or more memory addresses of the temporary storage device equal to a minimum block size that may be written to the high-density memory;
writing the data to a memory address in the one or more allocated memory addresses;
reading data from memory addresses, which will remain unmodified, included in the block of the high-density memory to which data is to be written;
storing data read from the unmodified memory addresses included in the block of the high-density memory to which data is to be written in the one or more allocated memory addresses of the temporary storage device; and
writing data stored in the one or more allocated memory addresses of the temporary storage device to the high-density memory.

2. The method of claim 1 further comprising writing the retrieved data into a volatile memory if the data retrieved from the first storage device is not characterized as data that is primarily read.

3. The method of claim 1 further comprising reading the retrieved data from the temporary storage device while writing the retrieved data in the high-density memory.

4. The method of claim 1, wherein monitoring for at least one of a processor access pattern to a memory, an attribute associated with a command and a memory address of the command includes monitoring for at least one of a processor access pattern to a memory, an attribute associated with a command and a memory address of the command, via software.

5. The method of claim 1 wherein monitoring for at least one of a processor access pattern to a memory, an attribute associated with a command and a memory address of the command includes monitoring for at least one of a processor access pattern to a memory, an attribute associated with a command and a memory address of the command, via digital logic.

6. The method of claim 1 wherein the temporary storage device is a cache memory.

7. The method of claim 6 wherein a memory controller includes the cache memory.

8. The method of claim 1 wherein the temporary storage device is a portion of a volatile memory.

9. The method of claim 1 further comprising making memory addresses of the temporary storage device in which the retrieved data is stored available for storing other data.

10. The method of claim 1 further comprising:
receiving a request to retrieve data from the first storage device; and
retrieving the data from the first storage device.

11. The method of claim 1 further comprising making the one or more allocated memory addresses of the temporary storage device available for storing other data.

12. An apparatus for efficient memory usage, comprising:
a high-density memory;
a volatile memory;
a first storage device;
a temporary storage device with short write latency; and
a monitoring device, coupled to the high-density memory, volatile memory, first storage device, temporary storage device, and adapted to identify data which is characterized as primarily read;
wherein the apparatus is adapted to:
determine whether data retrieved from the first storage device is characterized as data that is primarily read; and
if data retrieved from the first storage device is characterized as data that is primarily read:
write the retrieved data in the temporary storage device; and
write the retrieved data in the high-density memory,
wherein the apparatus is further adapted to:
monitor for at least one of a processor access pattern to a memory, an attribute associated with a command and a memory address of the command;
identify data retrieved from the first storage device as characterized as data that is primarily read based on the monitoring;
receive a request to write data to a memory address in the high-density memory;
allocate one or more memory addresses of the temporary storage device equal to a minimum block size that may be written to the high-density memory;
write the data to a memory address in the one or more allocated memory addresses;
read data from memory addresses, which will remain unmodified, included in the block of the high-density memory to which data is to be written;
store data read from the unmodified memory addresses included in the block of the high-density memory to which data is to be written in the one or more allocated memory addresses of the temporary storage device; and
write data stored in the one or more allocated memory addresses of the temporary storage device to the high-density memory.

13. The apparatus of claim 12 wherein the apparatus is further adapted to write the retrieved data into the volatile memory if the data retrieved from the first storage device is not characterized as data that is primarily read.

14. The apparatus of claim 12 wherein the apparatus is further adapted to read the retrieved data from the temporary storage device while writing the retrieved data in the high-density memory.

15. The apparatus of claim 12 wherein the apparatus is further adapted to monitor for at least one of a processor access pattern to a memory, an attribute associated with a command and a memory address of the command, via software.

16. The apparatus of claim 12 wherein the apparatus is further adapted to monitor for at least one of a processor access pattern to a memory, an attribute associated with a command and a memory address of the command, via the monitoring device.

17. The apparatus of claim 12 wherein the temporary storage device is a cache memory.

18. The apparatus of claim 17 further comprising a memory controller coupled to the high-density memory, volatile memory and first storage device; and
wherein the memory controller includes the cache memory.

19. The apparatus of claim 12 wherein the temporary storage device is a portion of the volatile memory.

20. The apparatus of claim 12 wherein the apparatus is further adapted to make memory addresses of the temporary storage device in which the retrieved data is stored available for storing other data.

21. The apparatus of claim 12 wherein the apparatus is further adapted to:
receive a request to retrieve data from the first storage device; and
retrieve the data from the first storage device.

22. The apparatus of claim 12 wherein the apparatus is further adapted to make the one or more allocated memory addresses of the temporary storage device available for storing other data.

* * * * *